United States Patent
Kim

[11] 3,901,913
[45] Aug. 26, 1975

[54] IMIDOORGANOSILICON COMPOUNDS

[75] Inventor: Yung K. Kim, Midland, Mich.

[73] Assignee: Dow Corning Corporation, Midland, Mich.

[22] Filed: June 7, 1974

[21] Appl. No.: 477,379

[52] U.S. Cl. .......................... 260/326 E; 260/46.5 E
[51] Int. Cl.² ...................................... C07D 209/32
[58] Field of Search ................................ 260/326 E

[56] References Cited
UNITED STATES PATENTS

| | | | |
|---|---|---|---|
| 3,325,450 | 6/1967 | Holub | 260/32.4 |
| 3,338,859 | 8/1967 | Green | 260/30.6 R |
| 3,414,584 | 12/1968 | Fink | 260/326 E |

*Primary Examiner*—Lewis Gotts
*Assistant Examiner*—D. R. Phillips
*Attorney, Agent, or Firm*—Robert F. Fleming, Jr.

[57] ABSTRACT

Compounds of the formula

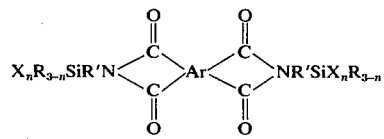

are prepared by reacting an aminofunctional silane with an aromatic dianhydride. The compositions are useful as high temperature coating resins. A typical compound is

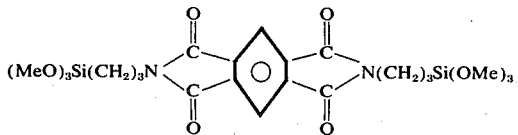

where Me is methyl.

5 Claims, No Drawings

IMIDOORGANOSILICON COMPOUNDS

Polyimides modified with organosilicon compounds are known. However, in all cases heretofore known the silicon compound is either reacted with a preformed polyimide or is reacted in such a way that one obtains a copolymer of siloxane units and polyimide units in which case the siloxane is part of the main polymer chain. These copolymers can be random or they can be in the form of block copolymers containing polyimide blocks and siloxane blocks. In addition the art shows polymers obtained by reacting a dianhydride with a preformed aminofunctional siloxane. Specifically, the following patents show the state of the art: U.S. Pat. Nos. 3,288,754; 3,338,859; 3,274,155; 3,598,784; and 3,325,450.

The novel features of the compounds of this invention are that the instant compounds have two silicon atoms for each anhydride residue and can be readily hydrolyzed and polymerized via conventional siloxane procedures.

It is the object of this invention to produce novel silanes and siloxanes which produce firmly adhering coatings on glass and metal substrates which coatings have excellent temperature stability. Other objects and advantages will be apparent from the following description.

This invention relates to compositions consisting essentially of organosilicon compounds of the formula

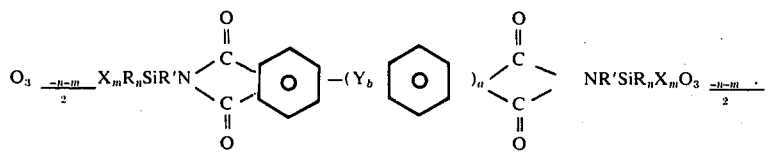

in which
X is OH, alkoxy, or betaalkoxyalkoxy,
R is lower alkyl, vinyl, phenyl or $CF_3CH_2CH_2$—,
R' is phenylene or divalent saturated aliphatic hydrocarbon of 1 to 6 carbon atoms,
Y is a linking radical of the group consisting of O, $CH_2$ and $SO_2$,
$m$ is 0 to 3,
$n$ is 0 to 1,
the sum of $m + n$ being no more than 3 and $a$ and $b$ are each 0 to 1, the two phenyl rings being fused when $a$ is 1 and $b$ is 0.

As can be seen, the compositions of this invention can be silanes, silanols, or siloxanes and the siloxanes can be homopolymers or copolymers in which two or more different siloxane units are present. Where Z is the

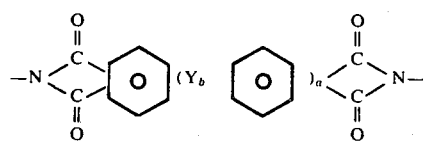

group. The silanes and silanols can be of the formulae $X_3SiR'ZR'SiX_3$, $X_2RSiR'ZR'SiRX_2$, $X_2RSiR'ZR'SiX_3$ and the siloxanes can be, for example, of the unit formulae $O_{.5}XRSiR'ZR'SiRXO_{.5}$, $OXSiR'ZR'SiXO$, $ORSiR'ZR'SiRO$, $ORSiR'ZR'SiXO$, $O_{.5}X_2SiR'ZR'ZSiX_2O_{.5}$, $O_{1.5}SiR'ZR'SiO_{1.5}$, $O_{1.5}SiR'ZR'SiRXO_{.5}$, $O_{1.5}SiR'ZR'SiRO$, $O_{1.5}SiR'ZR'SiXO$ and $O_{1.5}SiR'ZR'SiX_2O_{.5}$.

The silanes of this invention are best prepared by reacting two or more moles of a silane of the formula $X_mR_nSiR'NH_2$ with one mol of the dianhydride of the formula

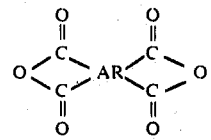

in which Ar is the defined aryl radicals. In those compounds where the substituents on the two silicon atoms are different, two different aminosilanes are reacted with the dianhydride.

The reaction between the aminosilane and the dianhydride is best carried out in polar solvents such as nitriles, such as acetonitrile; N,N-amides such as N,N-dimethylacetamide; sulfoxides such as dimethyl sulfoxide; amines such as pyridine or N-methyl-2-pyrrolidone; sulfones such as tetramethylene sulfone and dimethyltetramethylene sulfone and alcohols such as propanol, isopropanol, or the monomethyl ether of ethylene glycol. The latter is the preferred solvent for the reactions of this invention.

The reaction of the amine with the dianhydride is a two step process. The first step is the formation of the amide acid. Schematically, this involves the reaction

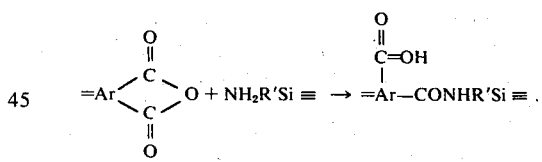

The reaction to form the amide acid generally takes place at from room temperature to 80°C. In some cases cooling is required because of its exothermic nature. The rate of reaction and the temperature at which it takes place varies with the solvent employed. After the formation of the amide acid, one may proceed in either of two directions; namely, the amide acid can be converted to the imide in solution or the solution of the amide acid can be applied to a substrate and heated to form the imide in situ.

In the first case, the solution can be heated at a higher temperature, say, at 80° to 100°C. or above to form the imide with the elimination of a molecule of water. When this reaction is carried out with hydrolyzable groups on the silicon and one wishes to retain these groups, it is desirable but not essential to include a water absorber in the reaction mixture. Suitable absorbers are anhydrous calcium sulfate and equivalent dehydrating agents or ethyl ortho silicate. If desired, of course, the reaction of the dianhydride and the aminosilane can be conducted at such a temperature that the acid amide will at once be converted to the imide.

Alternatively, one can first prepare the silane imide as shown above and thereafter hydrolyze the silane to a siloxane by conventional silicone hydrolysis techniques. The resulting siloxane will, of course, contain silanol groups and can be coated or impregnated and thereafter cured by conventional siloxane technology.

As is well known, suitable silanol condensation catalysts for curing the siloxane or for converting the silane to a siloxane in the presence of water are such catalysts as amines, such as, hexyl amine or triethanol amine; amine salts such as, hexyl amine acetate; salts of heavy metals and carboxylic acids such as dibutyltin diacetate, lead octoate or iron octoate and titanates such as, butyl titanate or ethyl titanate.

Secondly, the imide can be formed in situ, after coating or impregnating the substrate, by heating the composite at temperatures of 100° to 250°C. These conditions will cause imide formation and will at the same time cure the siloxane. If desired, the substrate can be coated with the amide acid silane and heated as shown above to simultaneously cause imide formation, hydrolysis of the silane (in the presence of water either atmospheric or derived from imidization) and condensation of the siloxane so formed to a cured imide siloxane.

The imidized compounds of this invention can contain some acid amide groups due to incomplete reaction. The presence of incidental amounts of these groups does not render the compositions inoperative for the purpose of this invention and compounds containing such unreacted acid amide groups are within the scope of the claims.

Those compounds of this invention which have four functional groups on the silicon, i.e., where $n$ equals 1, produce very tough flexible tightly adhering coatings and retain these properties even at elevated temperatures.

Under certain conditions, however, it is desirable to plasticize those compounds where $n$ is 0. These compounds are hexafunctional and may craze or crack at elevated temperatures unless they are plasticized by incorporating therein diorganosiloxanes such as dimethylsiloxane. This can be done by cohydrolyzing the amide silanes of this invention with conventional silanes according to well-known procedure or it can be done by condensing the alkoxy silanes of this invention with hydroxyl-containing siloxanes such as hydroxyl-ended dimethylpolysiloxanes, phenylmethylpolysiloxanes or trifluoropropyl methylpolysiloxanes. In carrying out these condensations, it is desirable to have a silanol condensation catalyst present.

The compositions of this invention are excellent high temperature coating and impregnating resins. They can also be used for molding articles and for other uses in which high temperature varnishes are employed such as electrical insulation. They are further characterized by excellent adhesion to substrates such as glass or metals. The compositions of this invention show good thermal stability as indicated by mere 10 percent weight loss at 850°C. by TGA in helium and excellent oxidation stability at 305°C. The cured coatings have pencil hardness of 9H or better and they have excellent adhesion to glass and metals.

In the compositions of this invention, X can be a hydroxy, any alkoxy group such as methoxy, ethoxy, isopropoxy, propoxy or octadecyloxy, or any beta-alkoxyalkoxy radical such as beta-methoxyethoxy, beta-methoxyisopropoxy, beta-methoxyisobutoxy, beta-ethoxyethoxy or beta-propoxyethoxy. Preferably, X contains from 1 to 6 carbon atoms. R can be any lower alkyl radical such as methyl, ethyl, propyl or butyl, the vinyl radical, the phenyl radical or the 3,3,3-trifluoropropyl radical. R' is the phenylene radical or any saturated aliphatic hydrocarbon radical of 1 to 6 carbon atoms such as methylene, dimethylene, trimethylene or hexamethylene.

The following examples are illustrative only and should not be construed as limiting the invention which is properly delineated in the appended claims. In the examples, the following abbreviations are used: Me for methyl, Ph for phenyl, Et for ethyl, Pr for propyl and Vi for vinyl.

EXAMPLE 1

This example shows the preparation of amino phenylmethyldipropoxysilane.

A solution of 800 g. of nitrophenylmethyldifluorosilane and 526 g. of dry n-propanol in 992 g. of dry pentane was prepared. Ammonia was bubbled through the mixture at room temperature for several days with rapid stirring until gas liquid chromatography analysis indicated that all the fluorosilane had been converted to the dipropoxysilane. The solution was filtered to remove ammonium fluoride and the product distilled to give nitrophenylmethyldipropoxysilane, boiling point 99° to 105°C. at 0.2 mm. (This was primarily the meta isomer, boiling point 104° to 105°C. at 0.2 mm.)

35 g. of this compound was placed in a pressure vessel together with 200 g. of dry n-propanol and 77.1 g. of ethyl ortho silicate (as a water scavenger). The vessel was flushed with $N_2$ and 0.45 g. of PtO was added. The vessel was flushed with hydrogen and a hydrogen pressure of 40 p.s.i. gauge was maintained until no more hydrogen was absorbed (4 hours). The product was distilled to give amino phenylmethyldipropoxy silane.

EXAMPLE 2

PREPARATION OF IMIDE

A mixture of 1 part by weight aminophenylmethyldipropoxy silane, 0.43 part by weight of pyromellitic dianhydride in 13 parts by weight of acetonitrile containing 0.66 part by weight zeolite molecular sieve 4-A was stirred at room temperature for 2.5 hours and heated at 81.3° to 81.6°C. with stirring overnight. The solution was filtered and the solvent was evaporated. Infrared analysis showed the product to be a siloxane of the unit formula

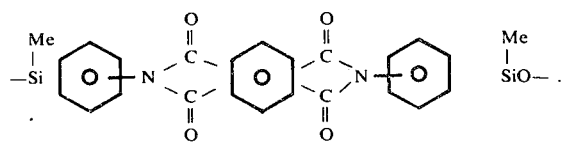

This indicates the molecular sieve did not remove the water originally present in the solvent.

EXAMPLE 3

This example illustrates the in situ preparation of the imide simultaneously with the siloxane.

0.43 part by weight of pyromellitic dianhydride, 1 part by weight of aminophenyl methyl dipropoxy silane and 0.91 part by weight of dimethyl sulfoxide were heated to 70° to 80°C. for 4 hours. Infrared analysis of the product showed the solution to be that of the amide-acid of the formula

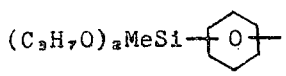

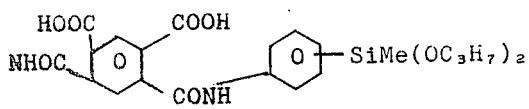

A catalytic amount of triethanol amine was added to this acid amide solution and the solution was evaporated on a glass plate to a 10 mil thickness film. The material was air dried overnight at room temperature and then baked 1 hour at 90°C. and 4 hours at 250°C. The resulting product was the imide siloxane which had excellent adhesion to the glass and a pencil hardness of 9H.

The above result was also obtained without the use of the triethanol amine catalyst.

EXAMPLE 4

This Example Shows Preparation Of The Imide In Solution 0.521 part by weight of pyromellitic dianhydride was reacted with 1 part by weight of gamma-aminopropyltriethoxy silane in 2 parts by weight of dimethyl sulfoxide. The solution was heated at 100°C. for 1 hour and infrared analysis showed the formation of the imide with some amide acid being present. This imide was of the formula

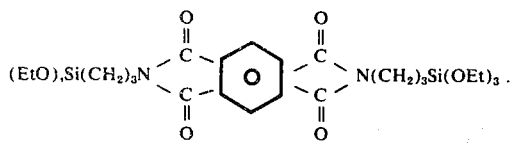

EXAMPLE 5

This Example Shows Plasticizing The Siloxane Imide With $(Me_2SiO)_x$ 19.64 g. of pyromellitic dianhydride and 40 g. of gamma-aminopropyltriethoxy silane in 128 g. of the monomethyl ether of ethylene glycol was mixed with cooling and then refluxed for 1½ to 2 hours. The product was the acid amide.

8.35 g. of the above solution was mixed with 0.24 g. of

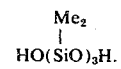

This gives a 5:1 mol ratio of the amide acid to the dimethyl siloxane. The solution was mixed with 0.5 percent by weight dibutyltin diacetate based on the solids content and the solution was evaporated on a glass plate to give a 10 mil thick film. The film was cured 2 days at room temperature and then 1 hour at 100°C. and 3 hours at 150°C. The resulting film had excellent adhesion to glass, a pencil hardness of 9H and had excellent thermal stability. Infrared analysis showed the film to be a siloxane copolymer containing

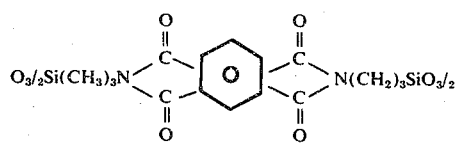

and $Me_2SiO$ units. There was a small amount of the amide acid structure present. The amide acid absorbs at 1640 $cm^{-1}$ and 1550 $cm^{-1}$ while the imide absorbs at 1770 $cm^{-1}$ and 1715 $cm^{-1}$.

EXAMPLE 6

When the following dianhydrides are reacted with the following silanes in the mol ratio of 1 to 2 in accordance with the procedure of Example 4, the following products are obtained:

Table -continued

Product

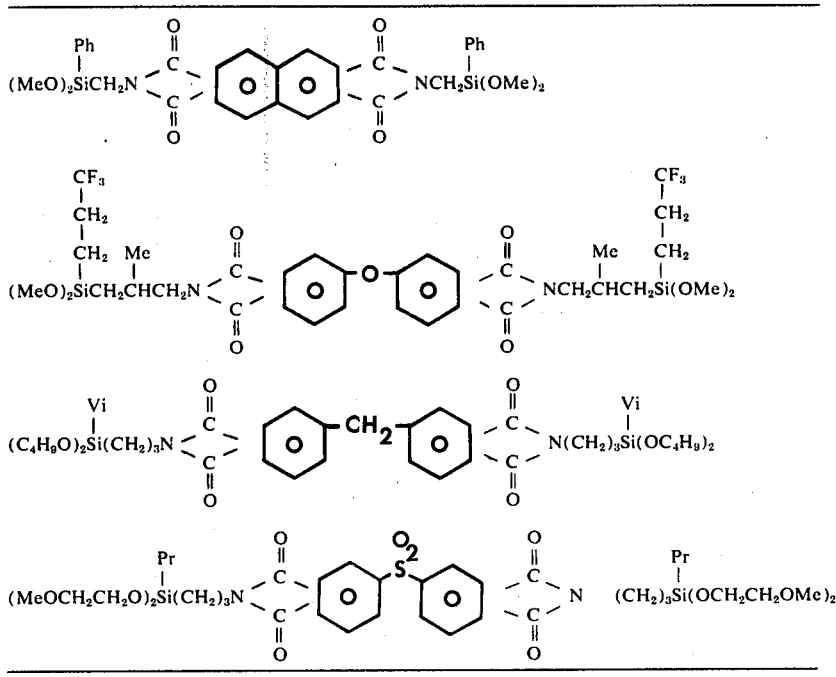

EXAMPLE 7

When the compound

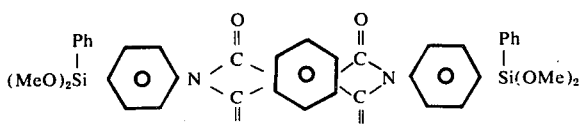

is hydrolyzed at a pH of 4 in a water isopropanol mixture, the silanol

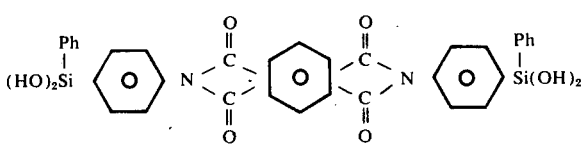

is obtained.

That which is claimed is:

1. A composition of matter consisting essentially of organosilicon compounds of the formula

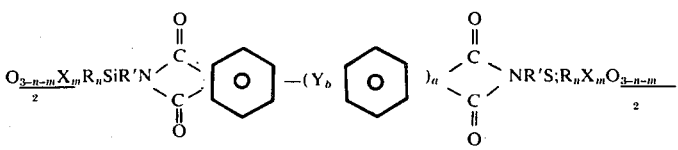

in which
X is OH, alkoxy, or beta-alkoxyalkoxy,
R is lower alkyl, vinyl, phenyl or $CF_3CH_2CH_2-$,
R' is phenylene or divalent saturated aliphatic hydrocarbon of 1 to 6 carbon atoms,
Y is a linking radical of the group consisting of O, $CH_2$ and $SO_2$,
$m$ is 0 to 3,
$n$ is 0 to 1,
the sum of $m + n$ being no more than 3 and $a$ and $b$ are each 0 to 1, the two phenyl rings being fused when $a$ is 1 and $b$ is 0.

2. The composition of claim 1 in which $a$ is 0 and R' is phenylene.

3. The composition of claim 2 in which $n$ is 1 and R is methyl.

4. The composition of claim 1 in which $a$ is 0 and R' is $(CH_2)_3$.

5. The composition of claim 4 in which X is ethoxy and $n$ is 0.

* * * * *